United States Patent
Hamon et al.

(10) Patent No.: US 10,552,296 B2
(45) Date of Patent: Feb. 4, 2020

(54) HUMAN-READABLE, LANGUAGE-INDEPENDENT STACK TRACE SUMMARY GENERATION

(71) Applicant: GOOGLE LLC, Mountain View, CA (US)

(72) Inventors: Dominic Hamon, San Francisco, CA (US); Ruixue Li, Foster City, CA (US)

(73) Assignee: Google LLC, Mountain View, CA (US)

( * ) Notice: Subject to any disclaimer, the term of this patent is extended or adjusted under 35 U.S.C. 154(b) by 118 days.

(21) Appl. No.: 15/789,755

(22) Filed: Oct. 20, 2017

(65) Prior Publication Data

US 2019/0121719 A1    Apr. 25, 2019

(51) Int. Cl.
*G06F 11/00* (2006.01)
*G06F 11/36* (2006.01)

(52) U.S. Cl.
CPC ...... *G06F 11/3636* (2013.01); *G06F 11/3684* (2013.01); *G06F 11/3688* (2013.01)

(58) Field of Classification Search
CPC ............. G06F 11/0751; G06F 11/0778; G06F 11/079; G06F 11/3636
See application file for complete search history.

(56) References Cited

U.S. PATENT DOCUMENTS

| | | | |
|---|---|---|---|
| 7,509,538 B2 | 3/2009 | Triou, Jr. et al. | |
| 9,009,539 B1 | 4/2015 | Kompotis et al. | |
| 9,213,622 B1 | 12/2015 | Morgan | |
| 9,256,517 B1 | 2/2016 | MacPherson et al. | |
| 9,535,818 B2 | 1/2017 | Vasudevan et al. | |
| 9,619,375 B2 | 4/2017 | Avgerinos et al. | |
| 10,223,238 B1 * | 3/2019 | Nash | G06F 11/366 |
| 2009/0089764 A1 * | 4/2009 | Lai | G06F 9/4484 717/143 |
| 2010/0211932 A1 * | 8/2010 | Jones | G06F 8/20 717/124 |

(Continued)

OTHER PUBLICATIONS

Ghafoor, Maryam Abdul, et al. "Cross Platform Bug Correlation using Stack Traces" 2016 International Conference on Frontiers of Information Technology (FIT), pp. 199-204. IEEE, 2016.

(Continued)

*Primary Examiner* — Michael Maskulinski
(74) *Attorney, Agent, or Firm* — Lerner, David, Littenberg, Krumholz & Mentlik, LLP

(57) ABSTRACT

Various aspects of the subject technology related to systems and methods for generating a human-readable, language-independent stack trace summary. A system may be configured to receive error reports which include a language-dependent stack trace generated in response to a software test failure and metadata. The generated language-dependent stack trace includes one or more frames. The system may generate a language-independent stack trace summary by processing each frame of the language-dependent stack trace by removing line number values from each of the one or more frames, removing column number values from each of the one or more frames, collapsing one or more file names identified in each of the one or more frames, and removing spaces from each of the one or more frames. The system may output the generated language-independent stack trace summary.

20 Claims, 8 Drawing Sheets

(56) References Cited

U.S. PATENT DOCUMENTS

| | | | |
|---|---|---|---|
| 2014/0258990 A1* | 9/2014 | Klic | G06F 11/3636 |
| | | | 717/128 |
| 2015/0106663 A1* | 4/2015 | Richter | G06F 11/3476 |
| | | | 714/45 |
| 2017/0116114 A1* | 4/2017 | Tosar | G06F 11/3684 |
| 2017/0132545 A1 | 5/2017 | Michaely et al. | |
| 2017/0185467 A1 | 6/2017 | Xiao et al. | |
| 2019/0018754 A1* | 1/2019 | Schmelter | G06F 9/547 |

OTHER PUBLICATIONS

International Search Report and Written Opinion dated Nov. 30, 2018 in International (PCT) Application No. PCT/US2018/048142.

* cited by examiner

410 · 405

Error Report 1378   Created: 070916   Test Suite: acme3_video_streaming

415

| Build Version: Linux RC1 v2.4.15   Error Type: Improper Attribute Name |
| Test Configuration: Automated Sandbox Testing   Client: Dev_glinux12 |
| HTTP Referrer: http://acme3.testsuites.sandbox/video/streaming.com/python/linux |
| Error Message: Undefined Placeholder |
| Stack Trace: |

420

File "acme3/video/streaming/src/python/wsgi_server/wsgi_handler.py", line 516, in run_servlet
File "acme3/video/streaming/src/python/servlets/streaming_servlet.py", line 1847, in run
File "acme3/video/streaming/src/python/servlets/_base_servlet.py", line 973, in get_chunked_response
File "acme3/video/streaming/src/python/servlets/watch.py", line 2901, in response
File "acme3/video/streaming/src/python/servlets/streaming_servlet.py", line 2390, in return_template
File "acme3/video/streaming/src/python/servlets/_base_servlet.py", line 1456, in return_template
File "acme3/video/streaming/src/python/servlets/_base_servlet.py", line 1502, in _fill_template
File "acme3/video/streaming/src/python/templates/x_base.py", line 81, in main
File "acme3/video/streaming/src/python/templates/web/watch_ajax.py", line 140, in output
File "acme3/third_party/py/spitfire/runtime/template.py", line 60, in filter_function
  File "acme3/third_party/py/spitfire/runtime/__init__.py", line 26, in __str__ PlaceholderError: ('title',
['_UndefinedPlaceholder__available_placeholders', '_UndefinedPlaceholder__name', '__call__',
'__class__', '__delattr__', '__dict__', '__doc__', '__format__', '__getattribute__', '__hash__', '__init__',
'__module__', '__new__', '__nonzero__', '__reduce__', '__reduce_ex__', '__repr__', '__setattr__',
'__sizeof__', '__str__', '__subclasshook__', '__weakref__'])`,

⇩

430 · 425

STS ID: 012802   Created: 070916   Test Suite: acme3_video_streaming

435

| Build Version: Linux RC1 v2.4.15   Error Type: Improper Attribute Name |
| Test Configuration: Automated Sandbox Testing   Client: Dev_glinux12 |
| HTTP Referrer: http://acme3.testsuites.sandbox/video/streaming.com/python/linux |
| Error Message: Undefined Placeholder |
| Stack Trace: |

"|\nthirdpartypyspitfireruntimeinit|str|\nthirdpartypyspitfireruntimetemplate|filterfunction|\
ntemplateswebwatchajax|output|\ntemplatesxbase|main|\nservletsbaseservlet|filltemplate|\
nservletsbaseservlet|returntemplate|\nservletsstreamingservlet|returntemplate|\
nservletswatch|response|\nservletsbaseservlet|getchunkedresponse|\
nservletsstreamingservlet|run|\nwsgiserverwsgihandler|runservlet|"

HUMAN-READABLE, LANGUAGE-INDEPENDENT STACK TRACE SUMMARY GENERATION

BACKGROUND

In a software development and release environments, detecting and fixing software test failures, (often called "bugs"), as early as possible ensures that the software being integrated or released will be error-free, production-quality software code. In these environments, it can be difficult to determine the root cause of a particular test failure, as well as the change in code that may have introduced the test failure. This problem is exacerbated in larger software development organizations where many individuals and/or teams of individuals are contributing code changes for integration into software builds for testing and product release. In addition, once a test failure has been identified, it is important to determine whether or not the test failure is identical to an existing, known issue or whether the test failure is a new issue that must be assigned to a specific individual or team of individuals who will perform further investigation of the test failure and provide a fix to the code that caused the test failure. Test failure data may include metadata identifying a specific priority, the rate of failure, and/or the configuration of the integration or build environment in which the test failure was discovered.

Stack traces are generated and output by a compiler when the compiler cannot interpret an active stack frame at a certain point in time during the execution of a program. Stack traces may also be displayed to users as part of an error message. Stack traces identify the active stack frames that are associated with the failure. Stack traces are difficult to read and interpret because the format of the stack trace is language-dependent and typically includes a sequenced list of the functions that were called up to the point at which the error occurred and the stack trace was generated. Stack traces can also be retrieved via language specific built-in support, such as system calls, to return the current stack trace. The generated stack traces are commonly used in software development during interactive testing and debugging activities to determine the portions of code that are specifically associated with a particular test failure.

The description provided in the background section should not be assumed to be prior art merely because it is mentioned in or associated with the background section. The background section may include information that describes one or more aspects of the subject technology.

SUMMARY

According to one aspect, the disclosure relates to a computer-implemented method for generating a human-readable, language-intendent stack trace summary. The method includes receiving a plurality of error reports which include a language-dependent stack trace generated in response to a software test failure and a plurality of metadata. The language-dependent stack trace including one or more frames. The method also generating a language-independent stack trace summary by processing each frame of the language-dependent stack trace by at least two of: removing line number values from each of the one or more frames, removing column number values from each of the one or more frames, collapsing one or more file names identified in each of the one or more frames, and removing spaces from each of the one or more frames. The method further includes outputting the generated language-independent stack trace summary.

In some implementations, the method includes processing each frame of the language-dependent stack trace by at least three of: removing line number values from each of the one or more frames, removing column number values from each of the one or more frames, collapsing one or more file names identified in each of the one or more frames, and removing spaces from each of the one or more frames. In some implementations, the method includes processing each frame of the language-dependent stack trace by all of: removing line number values from each of the one or more frames, removing column number values from each of the one or more frames, collapsing one or more file names identified in each of the one or more frames, and removing spaces from each of the one or more frames.

In some implementations, the method includes applying a hash function to the generated language-independent stack trace summary and outputting the hashed language-independent stack trace summary. In some implementations, the plurality of metadata included in the error report identifies one or more of: a unique identifier, a build version, a client name, an HTTP referrer, an error type, or a test configuration description.

In some implementations, the method includes generating a cluster of language-independent stack trace summaries including similar language-independent stack trace summaries. In some implementations, the method includes determining the language-independent stack trace summaries are similar by comparing error types, error messages, and file names identified in each of one or more frames included in each of the language-independent stack trace summaries to one another. In some implementations, the cluster is associated with a unique software test failure. In some implementations, the cluster is associated with a unique software test failure based on comparing a value in the language-independent stack trace summary to values stored in one or more lookup tables including lists of previously determined unique software test failures. In some implementations, the unique software test failure is assigned to an owner-like individual based on determining change histories associated with one or more file names identified in one or more frames included in the language-independent stack trace summary. In some implementations, the unique software test failure is assigned to a team of individuals based on determining the ownership of code paths associated with one or more file names identified in one or more frames included in the language-independent stack trace summary and assigning the unique software test failure based on the determined code path ownership.

According to certain aspects of the present disclosure, a system for generating a human-readable, language-independent stack trace summary is provided. The system includes a memory storing computer-readable instructions and one or more lookup tables. The system also includes a processor configured to execute the computer-readable instructions. The instructions, when executed cause the processor to receive a plurality of error reports which include a language-dependent stack trace generated in response to a software test failure and a plurality of metadata. The language-dependent stack trace including one or more frames. The processors are further configured to generate a language-independent stack trace summary by processing each frame of the language-dependent stack trace by at least two of: removing line number values from each of the one or more frames, removing column number values from each of the one or more frames, collapsing one or more file names identified in each of the one or more frames, and removing spaces from each of the one or more frames. The processors are further configured to output the generated language-independent stack trace summary.

In some implementations, the processors are further configured to process each frame of the language-dependent stack trace by at least three of: removing line number values from each of the one or more frames, removing column number values from each of the one or more frames, collapsing one or more file names identified in each of the one or more frames, and removing spaces from each of the one or more frames. In some implementations, the processors are further configured to process each frame of the language-dependent stack trace by all of: removing line number values from each of the one or more frames, removing column number values from each of the one or more frames, collapsing one or more file names identified in each of the one or more frames, and removing spaces from each of the one or more frames.

In some implementations, the processors are configured to apply a hash function to the generated language-independent stack trace summary and outputting the hashed language-independent stack trace summary. In some implementations, the plurality of metadata included in the error report identifies one or more of: a unique identifier, a build version, a client name, an HTTP referrer, an error type, or a test configuration description.

In some implementations, the processors are further configured to generate a cluster of language-independent stack trace summaries including similar language-independent stack trace summaries. In some implementations, the processors are further configured to determine the language-independent stack trace summaries are similar by comparing error types, error messages, and file names identified in each of one or more frames included in each of the language-independent stack trace summaries to one another. In some implementations, the cluster is associated with a unique software test failure. In some implementations, the cluster is associated with a unique software test failure based on comparing a value in the language-independent stack trace summary to values stored in one or more lookup tables including lists of previously determined unique software test failures. In some implementations, the unique software test failure is assigned to an owner-like individual based on determining change histories associated with one or more file names identified in one or more frames included in the language-independent stack trace summary. In some implementations, the unique software test failure is assigned to a team of individuals based on determining the ownership of code paths associated with one or more file names identified in one or more frames included in the language-independent stack trace summary and assigning the unique software test failure based on the determined code path ownership.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 illustrates an example of generating a human-readable, language-independent stack trace summary according to the method of FIG. 3.

Figure 1:
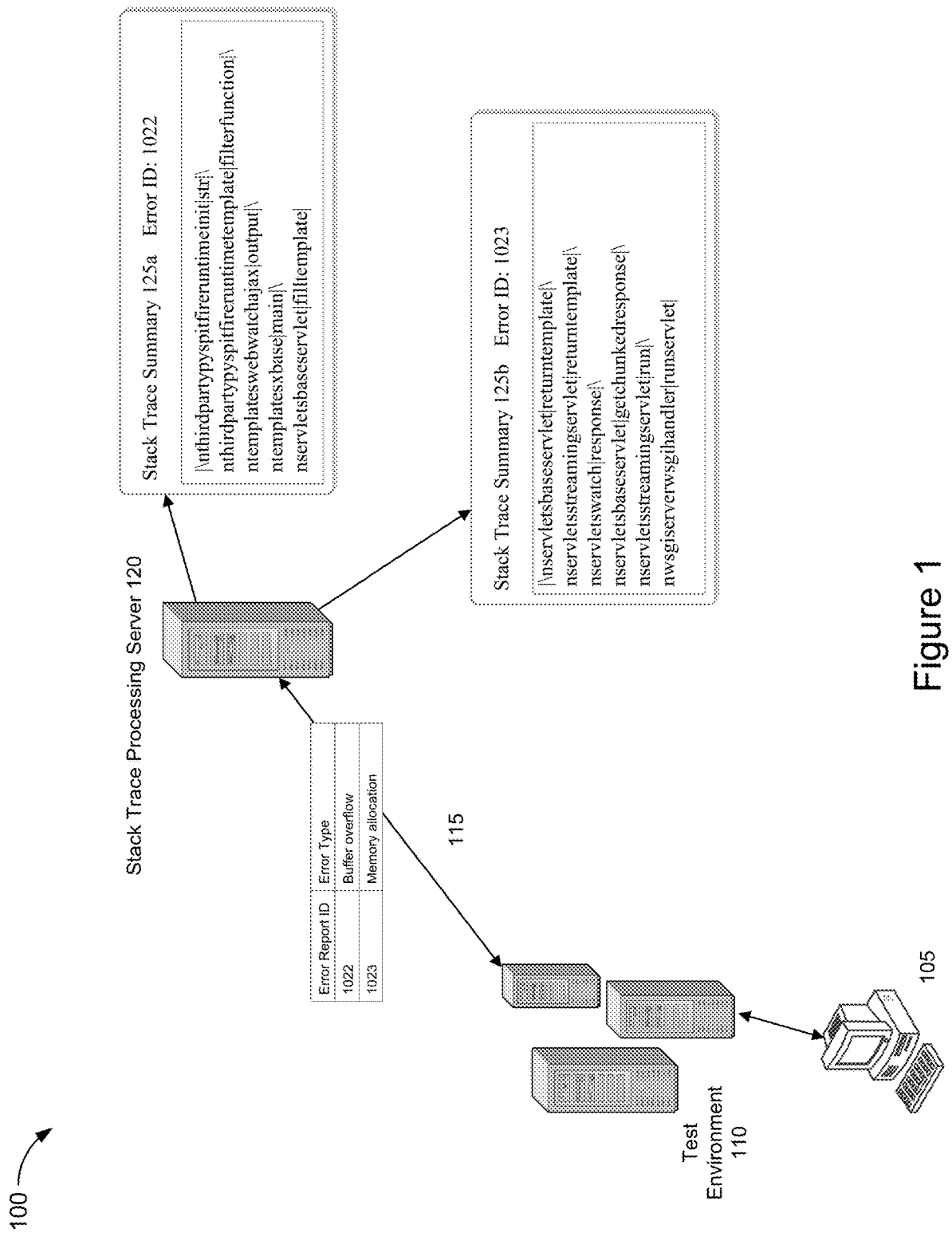
FIG. 1 illustrates an example architecture for generating a human-readable, language-independent stack trace summary.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The disclosed system and method relate to processing stack traces associated with test failures and generating a stack trace summary. The stack trace summary includes a stack trace format that is language-independent and more easily read and interpreted by humans, such as the individuals or team of individuals who may be assigned to fix the code which corresponds to the stack trace generated as a result of a test failure. The stack traces that are generated as a result of a test failure are processed by the system and method to create a transformed stack trace as a string that includes concatenated file names of the files that include the code that was being called at the time the failure occurred. The transformed stack trace may exclude other data that is commonly included in a stack trace such as line numbers, column numbers, spaces, and special characters as well as data pertaining to the specific build environment in which the test failure occurred. The transformed stack trace may be included in a stack trace summary which may include a unique identifier and other metadata associated with a specific test failure. The stack trace summaries can then aggregated into clusters including similar stack trace summaries and may be stored in a database. Tables may be used to determine which cluster a particular stack trace summary should be included in. Each stack trace summary cluster may represent a single canonical issue such that the stack trace summaries represented by the stack trace summary cluster possess similar error types, similar error messages and similar stack frame data. Tables may also be used to compare data associated with each stack trace summary to data that is associated with known issues in order to determine whether or not a particular stack trace summary corresponds to a known unique software test failure.

Based on the comparison, a unique software test failure record may be created for each unique stack trace summary cluster and assigned to an individual or team of individuals (e.g., a developer or team of developers) possessing the best knowledge of the error and the failing code that is associated with the error. Data sources such as a source code control system and/or an assignment database may be used to assign a particular cluster of stack trace summaries (and the associated unique software test failure record associated with the cluster) to an individual or a team of individuals. For example, the assignment database may be used, in conjunction with other data sources, to identify the code path ownership for the files identified in the cluster of stack trace summaries in order to identify the team of individuals who own the particular files which may have caused the test failure. In this way, the unique test failure record can be assigned to that team to address and fix the code which produced test failure. In some implementations, data from a source code control system may be leveraged to determine the specific person most likely to have introduced the code change associated with the test failure so that the test failure record can be assigned to that person. By analyzing the recent change histories of the files identified in the stack trace frames the ownership for the test failure and corresponding test failure record can be assigned to an individual who may have most recently modified one or more of the files (causing the test failure).

Providing a system and method to efficiently identify, characterize and assign test failures as new or duplicate issues, in near real-time to the appropriate individual or team of individuals responsible for fixing the failing code, would enable a software development organization to produce error-free, high-quality code more quickly while utilizing development resources more effectively. By utilizing the stack trace information that is routinely generated by software test failures and processing it into a format that can be leveraged for better readability and comparison may enable a software development organization to more accurately identify, cluster, and assign software test failures to be fixed.

The system and method disclosed herein address the problem of efficiently characterizing and assigning software test failures in order to accurately determine if the test failures are new test failures or previously known test failures. In large software development organizations, including open-source software development communities, testing the software can generate large numbers of test failure records that need to be evaluated and assigned to resources to fix the code which may have produced the test failure. Often the task of classifying and identifying test failure ownership is a manual task where a test engineer reviews the conditions under which the test failed and the code that was associated with the failure. This manual review process can be very time consuming and require specific knowledge of the test environment, test configurations and the files or code paths which may have caused the test failure. In automated testing systems, the evaluation and assignment process may be performed automatically but can generate many false positive test failures and duplicate test failure records because these systems typically lack any reference data or processing capabilities to compare newly generated test failures records to known test failure records. While the automated test system may automatically generate test failures and test failure records, the identification and verification of unique, non-duplicative test failures or test failure records still requires manual intervention.

A solution to this problem may be achieved by the disclosed system and method whereby error reports associated with test failures generated in a testing environment may be processed to automatically determine, in real-time, the uniqueness of a particular software test failure as well as the assignment of the test failure record to an individual or team of individuals responsible for fixing the code which produced the test failure. As will be discussed in the following description, stack traces generated as a result of a test failure may be transformed into language-independent formats that are more easily interpreted compared to their originally generated format. Transforming the stack trace not only aids readability, but further enables more efficient processing for comparison with other stack traces. Stack traces and stack trace summaries with similar content may be clustered together and associated with a unique software test failure. The cluster of software stack traces and the corresponding unique software test failure record may then be more easily assigned to development resources best suited to review the code which produced the test failure.

FIG. 1 illustrates an example architecture 100 for generating a human-readable, language-independent stack trace summary. The architecture 100 includes a computing device 105 and a test environment 110. The architecture 100 also includes a plurality of error reports 115 and a stack trace processing server 120. The architecture 100 also includes stack trace summaries 125, such as stack trace summary 125a and stack trace summary 125b.

As shown in FIG. 1, a computing device 105, such as a desktop computer, laptop computer, tablet, or any other similar network-accessible computing device may exchange data with test environment 110. For example, a developer or software engineer may develop code in a development environment, such as a developer sandbox, that may be configured on computing device 105. The developer may transmit or submit software code or changes to portions of software code to test environment 110 for testing. In some implementations, the software code may be new code that the developer seeks to integrate into a new build of a product codebase, such as a code to be incorporated into a production environment for subsequent release in a software product. In some implementations, the software code may be changes to portions of existing code that the developer seeks to integrate into an existing build for testing purposes, such as a code change necessary to fix an error found through testing the software code. The computing device 105 may be configured with or configured with access to a variety of software development resources such as integrated development environments (IDEs), unit test environments, sandbox or integration test environments, source code control systems, version control systems, or any other such environments or tools to provide the developer with a broad range of capabilities for creating, storing, managing, testing, integrating and distributing software code.

In addition, the computing device 105 may also be utilized by software test engineers. Software test engineers or quality assurance engineers develop software tests configured to evaluate or test specific behaviors of software code. For example, a test engineer may develop tests on computing device 105 and may transmit those tests to test environment 110. In some implementations, a test engineer may interact with a test facilities or resources that are configured on test environment 110 such as an automated test environment, an interactive test environment, a distributed test environment, as well as integration, build and/or production test environments. In some implementations, the computing device 105 may be used to write tests for submission to or integration with a specific test module or testing resource that is included in the test environment 110. In some implementations, the computing device 105 may be used to manage or configure existing testing resources or testing modules that are included in the test environment 110.

As shown in FIG. 1, the test environment 110 receives data from the computing device 105. The test environment 110 may include one or more servers storing instructions and data associated with various resources or tools that may be utilized in a software development organization for testing software. Such resources can include, but are not limited to, integration testing environments, build testing environments, production testing environments, distributed test environments, automated and interactive test environments, and any similar environment that may be configured for the purpose of testing software. In some implementations, the test environment 110 may be configured to receive and/or collect test failures found in a canary release environment. In some implementations, the test environment 110 may be configured to receive and/or collect test failures found in a production release environment. Additionally, or alternatively, the test environment 110 may also include software configuration management systems such as version control systems or source code control systems. A software development organization may configure the test environment 110 to test code changes associated with a specific product, module, or implemented by a specific group of developers in the organization. One skilled in the art will appreciate that the test environment 110 may be configured with a variety of software testing architectures, resources, and functionality depending on the differing needs of the software development organizations operating the test environment 110. For example, the test environment 110 may be configured to record errors found during testing (also known as bugs or defects) and output lists of testing errors and the associated error data to other testing components for subsequent processing or to teams or individuals who are in the best position to fix the software code that is associated with the errors found during testing.

As further shown in in FIG. 1, the test environment 110 exchanges error data, such as error reports 115, with the stack trace processing server 120. The errors and error data generated by testing software code using the test environment 110 may be collected into a list of error reports, such as the error reports 115 which includes multiple individual error reports. An individual error report may be identified by a unique identifier, such as an error report ID. For example, the error reports 115 include four unique error reports. One specific error report is identified as error report 1022 which is associated with a buffer overflow error that was discovered as a result of testing performed in the test environment 110. Similarly, for example, the error report 115 includes error report 1023 which is associated with a memory allocation error. In addition, an individual error report 115 may also include a language-dependent stack trace including one or more frames (not shown) which is generated in response to a software test failure associated with a test performed in or managed by the test environment 110. An individual error report 115 may also include a plurality of metadata about the test failure. The metadata may include, but is not limited to, an error report identifier and the build version of the code that generated the error. In some implementations, the error report metadata may also include a client name identifying a specific computing device 105 on which the error was initially discovered or can be reproduced on. The error report metadata may also include an HTTP referrer, an error type description, as well as an error message and a test configuration description that are each associated with the specific test for which the software code failed during testing in the test environment 110. Additional details of the error reports 115 will be discussed in more detail later in relation to FIG. 4.

As shown in FIG. 1, the architecture 100 also includes a stack trace processing server 120. In broad overview, the stack trace processing server 120 receives error reports 115 from the test environment 110 and processes the received error reports 115 to generate human-readable, language-independent stack trace summaries. The stack trace processing server 120 may then output the generated language-independent stack trace summaries, for example, the output language-independent stack trace summaries 125, shown as stack trace summaries 125a and 125b.

The stack trace processing server 120 may be configured as a server in a network which includes a memory storing error data as well was computer-readable instructions, and one or more processors to execute the computer-readable instructions. The stack trace processing server 120 may include data and/or components to receive error reports and process the error reports to generate the language-independent stack trace summaries 125. In addition, the stack trace processing server 120 may also include functionality and/or components to generate a cluster of language-independent stack trace summaries 125 that are similar. In some implementations, the stack trace processing server 120 may include a database storing lookup tables and other components that are used to associate a generated cluster of similar language-independent stack trace summaries 125 to a unique software test failure. In some implementations, the stack trace processing server 120 may include functionality and/or components to assign the cluster of similar language-independent stack trace summaries 125 that have been associated with a unique software test failure to a specific developer or development team who is best suited to fix the code corresponding to the software test failure.

The stack trace processing server 120 and the functionality that is configured within the server enables a software development organization to more rapidly process and diagnose errors found during testing in order to provide individual developers and development teams with more precise error data about the software code being developed. For example, the stack trace processing server 120 may generate a language-independent stack trace summary 125 that is easier for a human to interpret because the processing performed by the stack trace processing server 120 has removed or reformatted data that is typically included in a stack trace such as spaces, line number values, column number values, special characters, and file names from the contents of each frame that is included in the language-independent stack trace summary 125. The stack trace processing server 120 may generate the language-independent stack trace summary 125 regardless of the specific language that the software code being tested was implemented in or regardless of the specific build that the software code being tested was included in.

In addition, the stack trace processing server 120 may generate a cluster of similar language-independent stack trace summaries 125, which, when associated with a unique software test failure, better enable members of a software development organization to determine whether the error report and corresponding language-independent stack trace summaries 125 are related to an existing or previously-identified software test failure or whether the error report and corresponding language-independent stack trace summaries 125 are related to a new, canonical software test failure. The processing performed by the stack trace processing server 120 enables more efficient identification and de-duplication of unique software test failures which can save time and resources in software development organizations. Additional details of the functionality and components included in the stack trace processing server 120 will be discussed in more detail later in relation to FIG. 2.

As shown in FIG. 1, the architecture 100 also includes stack trace summaries 125. The stack trace summaries 125 include human-readable, language-independent stack traces and correspond to one or more error reports 115 that received by the stack trace processing server 120. For example, as shown in FIG. 1, the stack trace processing server 120 has generated language-independent stack trace summaries 125*a* and 125*b* that respectively correspond to the two received error reports (e.g., error report ID1022 and error report ID 1023). The stack trace processing server 120 generates the stack trace summaries 125 by methods that will be described in relation to FIGS. 3A and 3B. The stack trace that is included in the stack trace summaries 125 provides developers and/or test engineers with a more readable stack trace format than is normally generated by a compiler when there is an error in software code or portions of software code. In some implementations, the stack trace summaries 125 also include metadata (not shown) describing details that are associated with the specific test or test configuration for which the software code failed during testing. Additional details of the stack trace summaries 125 will be discussed in more detail later in relation to FIGS. 3B and 4.

Figure 2:
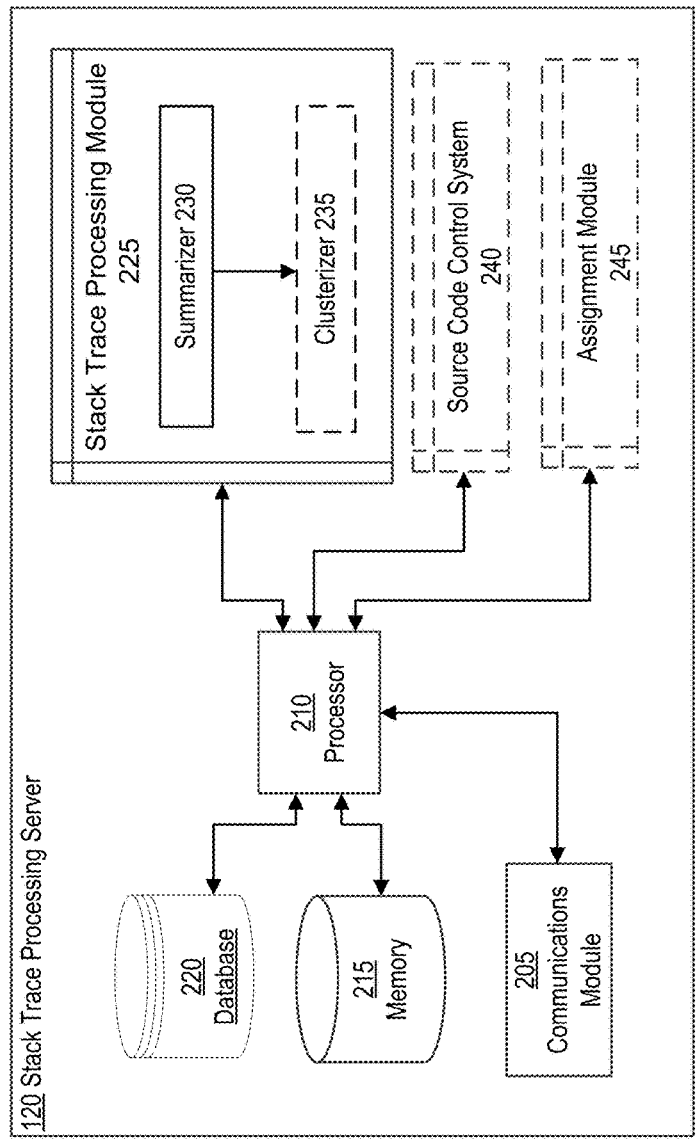
FIG. 2 illustrates an example block diagram of a system for generating a human-readable, language-independent stack trace summary according to some implementations.

FIG. 2 is an example block diagram of a system for generating a human-readable, language-independent stack trace summary according to some implementations. System 200 includes a stack trace processing server 120, such as the stack trace processing server 120 shown in FIG. 1. The stack trace processing server 120 includes a communications module 205 and a processor 210. The stack trace processing server 120 also includes a memory 215 and a database 220. The stack trace processing server 120 also includes a stack trace processing module 225 which includes a summarizer 230 and a clusterizer 235. The clusterizer 235 is shown in dashed lines to indicate that, in some implementations, the clusterizer 235 may be included in the stack trace processing module 225 and, in some implementations, the clusterizer 235 may not be included in the stack trace processing module 225. In addition, the stack trace processing server 120 includes a source code control system 240 and an assignment module 245. The source code control system 240 and the assignment module 245 are also shown in dashed lines to indicate that one or both components may be located outside of the stack trace processing server 120, for example the source code control system 240 and the assignment module 245 could be located in the test environment 110 or on a different network accessible server that is located remotely from the test environment 110 or the stack trace processing server 120.

As shown in FIG. 2, the system 200 includes a stack trace processing server 120. The stack trace processing server 120 operates to receive, store and process the error reports 115 received from the test environment 110. The stack trace processing server 120 can be any device having an appropriate processor, memory, and communications capability for generating a human-readable, language-independent stack trace summary. In some implementations, the stack trace processing server 120 may also generate a cluster of language-independent stack trace summaries 125. In some implementations, the stack trace processing server 120 may associate each generated cluster of similar stack trace summaries 125 to a unique software test failure. In some implementations, the stack trace processing server 120 may perform operations to assign the unique software test failure that is associated with the cluster of similar stack trace summaries 125 to an individual developer or a team of individual developers, for example by assignment module 245. In some implementations, one or more stack trace processing servers 120 can be co-located with the test environment 110 and/or the computing device 105. In some implementations, the stack trace processing server 120 may be located remotely from the test environment 110, for example in a cloud computing testing facility or in a remote data center that is connected to the test environment 110 via a network, such as the internet or a private network operated by the software development organization.

The stack trace processing server 120 includes a communications module 205. The communication module 205 receives and transmits data and/or computer-executable instructions that are associated with the processing and functionality corresponding to the stack trace processing server 120. For example, the communication module 205 receives the error reports 115 that are transmitted from the test environment 110 and outputs the generated language-independent stack trace summaries 125. In some implementations, the communications module 205 may output a unique software test failure that is associated with a cluster of similar language-independent stack trace summaries 125. In some implementations, the communications module may output a hashed language-independent stack trace summary 125.

The communications module 205 receives and transmits data and/or computer-executable instructions that are associated with the processing and functionality corresponding to the stack trace processing server 120 via a network (not shown). The network can include, for example, any one or more of a personal area network (PAN), a local area network (LAN), a campus area network (CAN), a metropolitan area network (MAN), a wide area network (WAN), a broadband network (BBN), the Internet, and the like. Further, the network can include, but is not limited to, any one or more of the following network topologies, including a bus network, a star network, a ring network, a mesh network, a star-bus network, tree or hierarchical network, and the like.

The stack trace processing server 120 also includes one or more processors 210 configured to execute instructions that when executed cause the processors to generate a human-readable, language-independent stack trace summary 125 as well as other processing and functionality corresponding to the stack trace processing server 120 that will be described herein. The processor 210 operates to execute computer-readable instructions and/or data stored in memory 215, as well as the database 220, and transmit the computer-readable instructions and/or data via the communications module 205.

The stack trace processing server 120 also includes a memory 215 configured to store the data and/or computer-executable instructions that are associated with the processing and functionality corresponding to the stack trace processing server 120. For example, memory 215 may store one or more error reports 115 that include language-dependent stack trace summaries and metadata to be processed in order to generate one or more human-readable, language independent stack trace summaries 125, as shown in FIG. 1, which correspond to the one or more received error reports 115. In addition, the memory 215 may store one or more lookup tables that are used to associate a cluster of similar language-independent stack trace summaries 125 to a unique software test failure. In some implementations, the memory 215 may store hash algorithms or functions that are used to generate a hashed version of the language-independent stack trace summary 125.

As further shown in FIG. 2, the stack trace processing server 120 includes a database 220. The database 220 stores data used to generate the language-independent stack trace summaries 125. The database 220 may also store data such as the one or more lookup tables that are used to associate a cluster of similar language-independent stack trace summaries 125 to a unique software test failure. For example, the database 220 may include one or more tables identifying all of the currently known issues that are associated with a particular code base or build version. The database 220 may include a table of known test failures that are associated with a particular code language, test suite, error message, and/or error type. In some implementations, the database 220 may include tables associating a known test failure to an individual developer, or team of individual developers. In addition, the database 220 may store data that is used to assign a particular software test failure to an individual developer or a team of individual developers, such as data associated with source code control systems including file change histories, code path and file ownership data. In some implementations, the database 220 may store a variety of data that can be used to generate human-readable, language-independent stack trace summaries 125 and map, assign, or otherwise associate the stack trace summaries 125 to unique software test failures for assignment to an individual developer or team of developers.

As shown in FIG. 2, the stack trace processing server 120 includes stack trace processing module 225. The stack trace processing module 225 functions to process the received error reports 115 and generate stack trace summaries 125 that include human-readable, language-independent stack traces generated as a result of software code failing a test. In some implementations, the stack trace processing module 225 may receive a stack trace independent of an error report 115 (e.g., a stack trace not included in an error report) and may generate a language-independent stack trace based on the received stack trace.

As shown in FIG. 2, the stack trace processing module 225 includes a summarizer 230. The summarizer 230 processes the data that is included in one or more of the received error reports, such as error reports 115 and generates a human-readable stack trace summary, such as the stack trace summaries 125 shown in FIG. 1. For example, the summarizer 230 generates a stack trace summary 125 by processing each frame of the language-dependent stack trace and the associated metadata included in the received error report 115. For example, the summarizer 230 processes each frame of the language-dependent stack trace by performing a combination of processing steps that can include one or more of: removing line number values from each frame, removing column number values from each frame, collapsing file names identified in each frame, removing spaces from each frame, and/or removing special characters from each frame. In some implementations, the language-independent stack trace summary 125 is generated by processing each frame of the language-dependent stack trace included in the error report 115 by any two of the aforementioned processing steps. In some implementations, the language-independent stack trace summary 125 is generated by processing each frame of the language-dependent stack trace included in the error report 115 by any three of the aforementioned processing steps. In some implementations, the language-independent stack trace summary 125 is generated by processing each frame of the language-dependent stack trace included in the error report 115 by all of the aforementioned processing steps. The resulting stack trace that is generated is more easily interpreted by a developer or team of developer due to the removal of these specific data elements or values from the received stack trace. In addition, in some implementations, the summarizer 230 also includes a hash algorithm or function that can be applied to the generated stack trace summary 125. The summarizer 230 may apply the hash algorithm to the generated stack trace summary 125 and generate a hashed stack trace summary that can be compared to other hashed stack trace summaries 125 to determine whether or not the stack trace summaries are similar, which may indicate the test failures are associated with similar portions of code or files.

As shown in FIG. 2, the stack trace processing module 225 includes a clusterizer 235. The clusterizer 235 is shown in dashed lines to indicate that, in some implementations, the clusterizer 235 may be included in the stack trace processing module 225, while in some implementations, the clusterizer 235 may be located outside of the stack trace processing module 225 or excluded, all together. The clusterizer 235 receives the stack trace summaries 125 generated by the summarizer 230 and generates a cluster of similar stack trace summaries. The clusterizer 235 may determine whether or not the stack trace summaries 125 are similar based on comparing the error types, error messages, hashed stack traces or hashed stack trace summaries, and/or the file names identified in each of the frames included in each of the stack trace summaries 125. The clusterizer 235 generates the cluster of similar stack trace summaries so that a unique software test failure record may be associated with each generated cluster. For example, the clusterizer 235 may associate a cluster with a unique software test failure record based on comparing a value in the language-independent stack trace summary 125 to values stored in a lookup tables which identify unique software test failures that have been previously determined. By comparing the values in the similar stack trace summaries 125 that are included in a cluster to values in tables identifying known or existing software test failures, the clusterizer can determine whether or not the similar stack trace summaries 125 are associated with known software test failures (and thereby duplicates) or if the similar stack trace summaries 125 are associated with software test failures that may represent a new, canonical issue or test failure.

As further shown in FIG. 2, the stack trace processing server 120 includes a source code control system 240. The source code control system 240 is shown in dashed lines in FIG. 2 to indicate that in some implementations, the source code control system 240 may be included in the stack trace processing server 120, while in some implementations, the source code control system 240 may be located outside of the stack trace processing server 120. The source code control system 240 provides data to the assignment module 245 that is used to assign a unique software test failure record (and the associated cluster of similar language-independent stack trace summaries) to an individual developer or a team of individual developers. In some implementations, the unique software test failure record (and the associated cluster of similar language-independent stack trace summaries) may first be assigned to a team of individual developers and subsequently assigned to an individual who is a member of the team of individual developers. In some implementations, the source code control system 240 may receive or store file change histories associated with the files identified in each frame of the stack trace summaries. The file change histories may identify an owner-like individual or team of individuals who made the most recent change to the file. The assignment module 245 may assign the software test failure based on identifying the individual developer or team of developers who recently changed the file or files included in the stack trace summary for which the test failure is associated. Often the individual developer or team of developers who most recently changed the file is the best resource to evaluate the test failure record and implement a fix for the test failure.

As further shown in FIG. 2, the stack trace processing server 120 includes an assignment module 245. The assignment module 245 is also shown in dashed lines in FIG. 2 to indicate that in some implementations, the assignment module 245 may be included in the stack trace processing server 120, while in some implementations, the assignment module 245 may be located outside of the stack trace processing server 120. The assignment module 245 receives data from the clusterizer 235 that is used to assign a unique software test failure record (and the associated cluster of similar language-independent stack trace summaries) to an individual or to a team of developers. In some implementations, the unique software test failure record (and the associated cluster of similar language-independent stack trace summaries) may first be assigned to a team of individual developers and subsequently assigned to an individual who is a member of the team of individual developers. In some implementations, the assignment module 245 may receive or determine the file ownership or code path ownership of the files identified in each frame of the stack trace summaries 125. The assignment module 245 may assign the software test failure record based on identifying the individual or team of individuals who own the files or code paths identified each frame of the stack trace summaries 125. The individual developer or teams of developer who own the files or code paths that are associated with the software test failure are generally the best resources to evaluate the test failure record and implement a fix for the test failure.

Figure 3A:
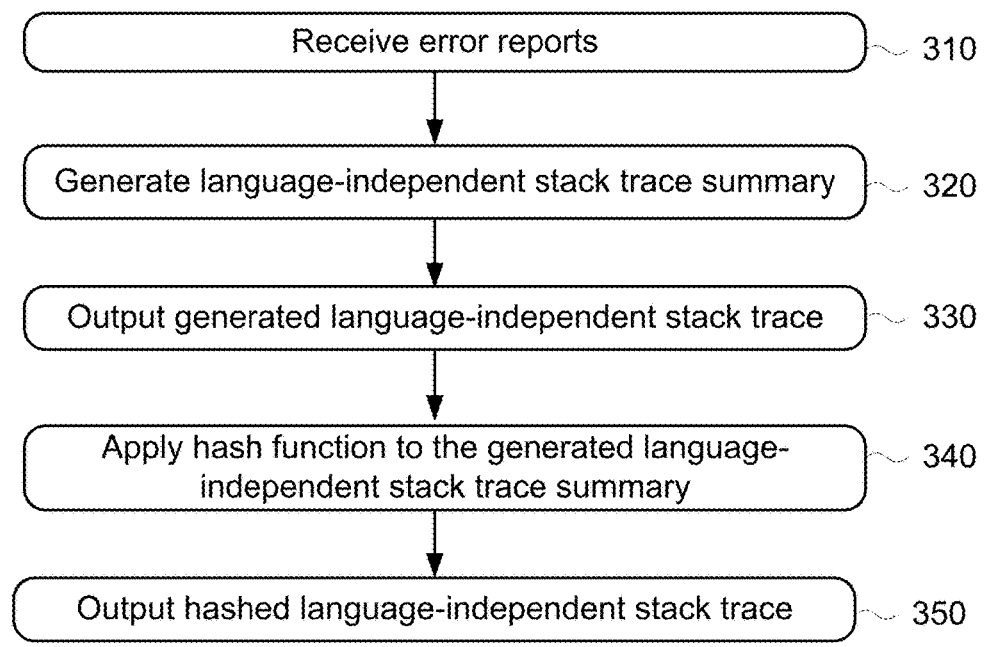
FIG. 3A is a flowchart showing a method for processing error reports.

FIG. 3A illustrates an example method 300a for processing error reports performed by the stack trace processing server 120 shown in FIGS. 1 and 2. The method 300a includes receiving error reports (stage 310). The method further includes generating language-independent stack trace summaries (stage 320) and outputting generated language-independent stack trace summaries (stage 330). The method also includes applying a hash function to the generated language-independent stack trace summary (stage 340) and outputting a hashed language-independent stack trace (stage 350).

At stage 310, the process 300a begins by receiving error reports, such as error reports 115 shown in FIG. 1. The stack trace processing server 120 may receive error reports from a test environment, such as the test environment 110 shown in FIG. 1. The error reports may be previously generated error reports that resulted from testing performed in the past and are stored on memory located in the test environment 110. The error reports 115 may also be dynamically generated in real-time based on testing that is being executed in the test environment 110. In some implementations, the stack trace processing server 120 may poll the test environment periodically, such as every minute, hour, or day, to receive the error reports 115 that have been generated as a result of the testing being performed in the test environment 110. In some implementations, the stack trace processing server 120 may receive the error reports 115 that have been output by the test environment 110 on a scheduled or ad-hoc basis. For example, the test environment 110 may be configured to transmit error reports 115 that have accumulated as a result of testing to the stack trace processing server 120 on a periodic basis, such as every minute, hour, or day. Additionally, or alternatively, the test environment may be configured to transmit error reports 115 to be received by the stack trace processing server 120 as a result of instructions or commands provided by a user, such as a test engineer. In some implementations, the stack trace processing server 120 may receive error reports 115 that are individually transmitted. In some implementations, the stack trace processing server 120 may receive error reports 115 in batches of multiple individual error reports 115, for example as a list of error reports 115 as shown in FIG. 1.

At stage 320, the stack trace processing server 120 generates language-independent stack trace summaries. Based on receiving the error reports 115, the stack trace processing server 120 implements methods to process the received error reports and generate a language-independent stack trace summary, such as the language-independent stack trace summaries 125 shown in FIG. 1. For example, the received error reports may be processed by the summarizer 230 included in the stack trace processing module 225 as shown in FIG. 2 to generate the language-independent stack trace summaries 125. The stack trace summaries 125 are generated using language-dependent methods which correspond to the software language used to implement the failing code for which the error report was generated. For example, the stack trace processing server 120 may utilize Java processing methods to process error reports containing stack traces associated with test failures of code that was written in the Java programming language in order to generate a language-independent stack trace summary 125. Similarly, for error reports that include stack traces associated with test failures of code written in the Python programming language, the stack trace processing server 120 would process the error reports using methods that are specific to the Python language in order to generate a human-readable, language-independent stack trace summary. Additional detail regarding the specific methods of processing the received error reports 115 to generate language-independent stack trace summaries 125 will be discussed in more detail in relation to FIG. 3B.

At stage 330, the stack trace processing server 120 outputs the generated language-independent stack trace summaries. For example, based on processing the received error reports, the summarizer 230 included in the stack trace processing module 225 may output the generated language-independent stack trace summaries 125. In some implementations, the stack trace processing server 120 may output the generated language-independent stack trace summaries 125 to a database, such as database 220 shown in FIG. 2. In some implementations, the stack trace processing server may output the generated language-independent stack trace summaries 125 to a computing device, such as computing device 105 shown in FIG. 1. Additionally, or alternatively, the stack trace processing server 120 may store the generated language-independent stack trace summaries 125 that are output in memory 215. In some implementations, the output of the generated language-independent stack trace summaries 125 is transmitted to a clustering component, such as the clusterizer 235 shown in FIG. 2.

At stage 340, the process 300a applies a hash function to the generated language-independent stack trace summary. A hash algorithm or function may be applied to the stack trace included in the generated language-independent stack trace summary 125. In some implementations, the hash algorithm or function may be applied to the generated language-independent stack trace summary 125a as a whole. A variety of hash functions or algorithms may be selected to generate a hashed version of the language-independent stack trace summary. The selected hash algorithm or function will be best suited for use if the hash algorithm or function generates consistent hashes regardless of the build of software code (or the locations of the code in the build) for which the test failure which generated stack trace is associated. Similarly, a hash function or algorithm will be best suited for use if the hash algorithm or function generates consistent hashes regardless of the programming language in which the code associated with the test failure which generated the stack trace was implemented in. In some implementations, the hash function or algorithm may be stored in memory 215 of the stack trace processing server 120. In some implementations, the hash function or algorithm may be stored in the database 220 of the stack trace processing server 120.

At stage 350, the process 300*a* outputs the hashed language-independent stack trace. The summarizer 230 of the stack trace processing module 225 may output the hashed language-independent stack trace to clusterizer 235 for use in determining stack traces that are similar based on the hashed stack trace so that the hashed language-independent stack traces may be assigned together in a cluster and further associated with a unique software test failure. In some implementations, the hashed language-independent stack traces may be output to the test environment 110 and/or the computing device 105.

Figure 3B:
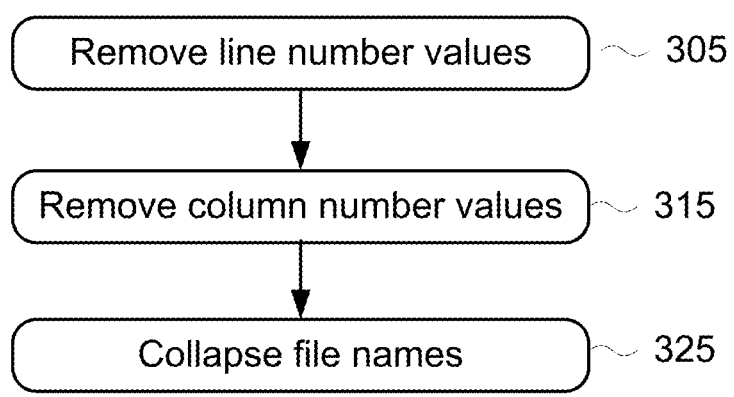
FIG. 3B is a flowchart showing a method for processing language-dependent stack traces.

FIG. 3B illustrates an example method 320 for processing language-dependent stack traces performed by the stack trace processing server 120 shown in FIGS. 1 and 2. The method 320 generates a language-independent stack trace summary (e.g., stage 320 of FIG. 3A) by performing the processing steps which include removing line number values (stage 305), removing column number values (stage 315), and collapsing file names (stage 325). Unless indicated otherwise, the steps of method 320 are performed by the summarizer 230 that is included in the stack trace processing module 225 of the stack trace processing server 120 shown in FIG. 2. In some implementations, all of the method steps 305 through 325 are performed to generate the language-independent stack trace summary 125. In some implementations, two of the method steps 305 through 325 are performed to generate the language-independent stack trace summary 125. In some implementations, three of the method steps 305 through 325 are performed to generate the language-independent stack trace summary 125.

At stage 305, the process 320 includes removing line number values from the language-dependent stack trace that is included in the error report received by the stack trace processing server 120. For example, stack traces for certain programming languages commonly include line number values in each frame of the stack trace indicating the specific line of code at which an error was generated during testing. The line number values may provide some benefit for diagnosing the specific location in the code that is associated with a test failure, however for the purposes of comparing stack traces or assisting human readability, the line number values provide less benefit and often make the stack trace more difficult to read. The summarizer 230, shown in FIG. 2, uses language-dependent methods to parse each frame included in the stack trace and removes the line number values from the stack trace frame.

At stage 315, the process 320 includes removing column number values from the language-dependent stack trace that is included in the error report received by the stack trace processing server 120. For example, stack traces for some programming languages may include column number values in each frame of the stack trace indicating the column in the code at which an error was generated during testing. The column number values may provide some benefit for diagnosing the specific location in the code that is associated with a test failure, however for the purposes of comparing stack traces or assisting human readability, the column number values provide less benefit and often make the stack trace more difficult to read. The summarizer 230, shown in FIG. 2, uses language-dependent methods to parse each frame included in the stack trace and removes the column number values from the stack trace frame.

At stage 325, the process 320 includes collapsing the file names from the language-dependent stack trace that is included in the error report received by the stack trace processing server 120. For example, stack traces commonly include file names in each frame of the stack trace indicating the specific file that contained the code for which an error was generated during testing. The file names may provide some benefit for diagnosing the specific file that is associated with a test failure, however for the purposes of comparing stack traces or assisting human readability, the full file name provides less benefit and often makes the stack trace more difficult to read. The summarizer 230, shown in FIG. 2, uses language-dependent methods to parse each frame included in the stack trace and to collapse the file name into a reformatted file name representation that is easier to read and process for stack trace comparison. For example, the summarizer 230 may collapse the file names by removing spaces from the file names or by removing special characters from the file names.

In some implementations, the summarizer 230 may collapse the file names by removing spaces from the file names of the language-dependent stack trace that is included in the error report received by the stack trace processing server 120. For example, stack traces may include file names that have spaces in the file name identified in each frame of the stack trace for which an error was generated during testing. The file name spaces included in file names represent the most accurate syntax of the file name that is associated with a test failure, however for the purposes of comparing stack traces or assisting human readability, the file name spaces are not required and may make the stack trace more difficult to read. The summarizer 230, shown in FIG. 2, uses language-dependent methods to parse each frame included in the stack trace and removes the file name spaces from the file name identified in the stack trace frame.

In some implementations, the summarizer 230 may collapse the file names by removing special characters from the language-dependent stack trace that is included in the error report received by the stack trace processing server 120. For example, stack traces may include special characters in the frames of the stack trace such as underscores(_), percentage (%), asterisks (*), dollar signs ($), ampersand (&), left or right floor characters, left or right ceiling characters, back quotes, and/or any non-letter, non-numeral symbol that may be included in a stack trace. The special characters may represent the most accurate syntax of the compilers output that corresponds to the code associated with a test failure, however for the purposes of comparing stack traces or assisting human readability, the special characters are not required and may make the stack trace more difficult to read. The summarizer 230, shown in FIG. 2, uses language-dependent methods to parse each frame included in the stack trace and removes the special characters from the stack trace frame.

FIG. 4 is an example diagram of generating a human-readable, language-independent stack trace summary according to the method of FIG. 3. As shown in FIG. 4, an error report 405 includes a unique identifier 410 (e.g., error report 1378) and a plurality of metadata 415. The error report 405 also includes a language-dependent stack trace 420 that includes a number of frames each identifying a file name associated with the particular software test failure for which the error report corresponds. The error report 405 is a more detailed version of the error report 115 that was generated from the test environment 110 and received by the stack trace processing server 120 as shown in FIG. 1. As further shown in FIG. 4, the stack trace processing server 120 may process the received error report 405 and generate a language-independent stack trace summary 425. The language-independent stack trace summary 425 also includes a unique identifier 430 (e.g., STS ID: 012802) and a plurality of metadata 435. The language-independent stack trace summary 425 also includes a human-readable, language-independent stack trace 440.

As shown in FIG. 4, an error report 405 may be generated as a result of a test failure. The error report 405 includes a variety of data that may be useful in characterizing the failure and fixing the code that failed the test and generated the error report. For example, the error report 405 includes the date on which the error report was created as well as the particular test suite that includes the specific test which failed, resulting in generated error report 405. The error report 405 also includes a plurality of metadata 415 which includes, but is not limited to, information describing configuration details of the test environment, the error message and error type, the build of software that was being tested, as well as the computing device 105 on which the test failure was discovered (e.g., Client: Dev_glinux12). The HTTP referrer metadata identifies an HTTP header field corresponding to the address of a web page that links to a resource being requested. A test environment may utilize this metadata for statistical purposes to identify the web pages that were being requested when the test failure occurred. Individual metadata elements may be used in conjunction with the stack trace processing described earlier to determine whether or not the language-independent stack trace summaries generated by the aforementioned processing are similar and thus may be associated with the same unique software test failure. For example, language-independent stack trace summaries which include similar error messages or error types may be indicative of similar software test failures.

As further shown in FIG. 4, the error report 405 includes a language-dependent stack trace 420. The language-dependent stack trace 420 includes frames each identifying a specific file name, line number and component or code module that was associated with the software test failure. The summarizer 230 reformats the contents of the language-dependent stack trace 420 into a human-readable, language-independent format by a combination of processing steps described in relation to FIG. 3B.

As shown in FIG. 4, the error report 405 is processed by the summarizer 230 to generate the language-independent stack trace summary 425. The language-independent stack trace summary 425 includes a unique identifier 430, a plurality of metadata 435 and a language-independent stack trace 440. In some implementations, the language-independent stack trace summary 425 includes more or less metadata as the error report 405 to which it corresponds. The exact format of the error report 405 and the generated language-independent stack trace summary 425 may vary based on the informational needs or processing requirements of the software development organization. As can be seen in FIG. 4, the language-independent stack trace summary 425 includes similar metadata 435 as the metadata 415 that is included in the error report 405. The generated language-independent stack trace 440 has been reformatted by the processing performed by the summarizer 230 into a more readable format. For example, the file names included the frames of language-independent stack trace 440 have been processed to remove the line number values and the column number values. In addition, the file names have been collapsed by removing the file name spaces and any special characters from the format of the file names in the language-dependent stack trace 420 that was included in the error report 405.

Figure 5:
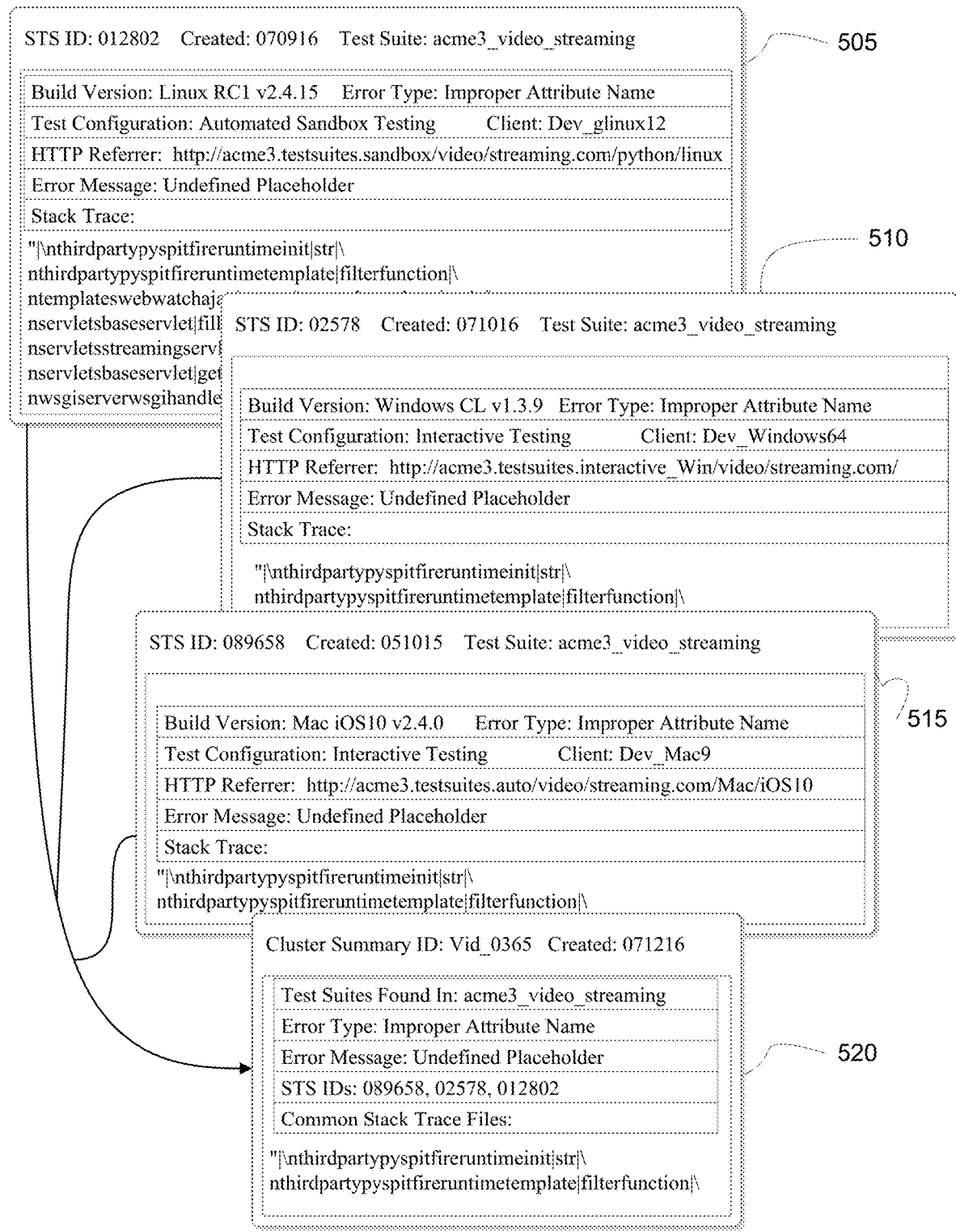
FIG. 5 illustrates an example of generating a cluster of language-independent stack trace summaries according to some implementations.

FIG. 5 illustrates an example of generating a cluster of language-independent stack trace summaries by stack trace processing server 120. The stack trace processing module 225 includes a clusterizer 235 which generates a cluster of language-independent stack trace summaries which are similar. As shown in FIG. 5, three language-independent stack trace summaries (e.g., stack trace summaries 505, 510, and 515) are clustered into a cluster of language-independent stack trace summaries 520. The clusterizer 235 that is included in the stack trace processing module 225 shown in FIG. 2, receives the generated language-independent stack trace summaries from the summarizer 230 and generates a cluster of language-independent stack trace summaries 520 which includes language independent stack trace summaries deemed to be similar to one another. The clusterizer 235 determines whether or not the language-independent stack trace summaries are similar based on comparing the error types, error messages, and/or file names identified in each of the frames included in the language-independent stack trace summary to one another. In some implementations, the clusterizer 235 determines whether or not the language-independent stack trace summaries are similar based on comparing the hashed language-independent stack trace summary that was generated by applying a hash function or algorithm to the generated language-independent stack trace summary. In some implementations, the clusterizer 235 determines whether or not the language-independent stack trace summaries are similar based on comparing the hashed language-independent stack trace that is included in the hashed language-independent stack trace summary. For the stack traces (hashed and non-hashed), stack trace summaries (hashed and non-hashed), error types, error messages, and/or the file names, the similarity between one or more of these items may be determined based on identical or partial matching of one item to another. In some implementations, two items may be determined to be similar based on identical or partial matching of one or more items included in the language-independent stack trace summary. For example, two language-independent stack trace summaries may be determine to be similar based on partially matching file names, that are identified in each frame of the language-independent stack trace that is included in each stack trace summary, even though the two stack trace summaries may not share a similar error message or error type.

As further shown in FIG. 5, the three language-independent stack trace summaries (e.g., stack trace summaries 505, 510, and 515) have been clustered into a cluster of language-independent stack trace summaries 520. The cluster of language-independent stack trace summaries 520 includes metadata such as a cluster summary ID, the date the cluster was created, as well as other metadata that is similar between the three language-independent stack trace summaries for which the cluster is associated. For example, the cluster metadata identifies the error type, error message, and the stack trace file names that were identified as similar in each of the language-independent stack trace summaries for which the cluster corresponds. In some implementations, the cluster may be created based on comparing similar stack trace summaries generated over a specific period of time, such as during the last day, week, or month. In some implementations, the cluster may be created based on comparing similar stack traces generated during a specific time period, such as stack traces summaries generated between two calendar dates. As shown in FIG. 5, the cluster of language-independent stack trace summaries 520 includes the generated language-independent stack trace identifying, in human-readable format, the file names that are common to or similar among the three language-independent stack trace summaries 505, 510, and 515 (e.g., file names \nthirdpartypyspitfireruntimeinit and \nthirdpartypyspitfireruntimetemplate).

Figure 6:
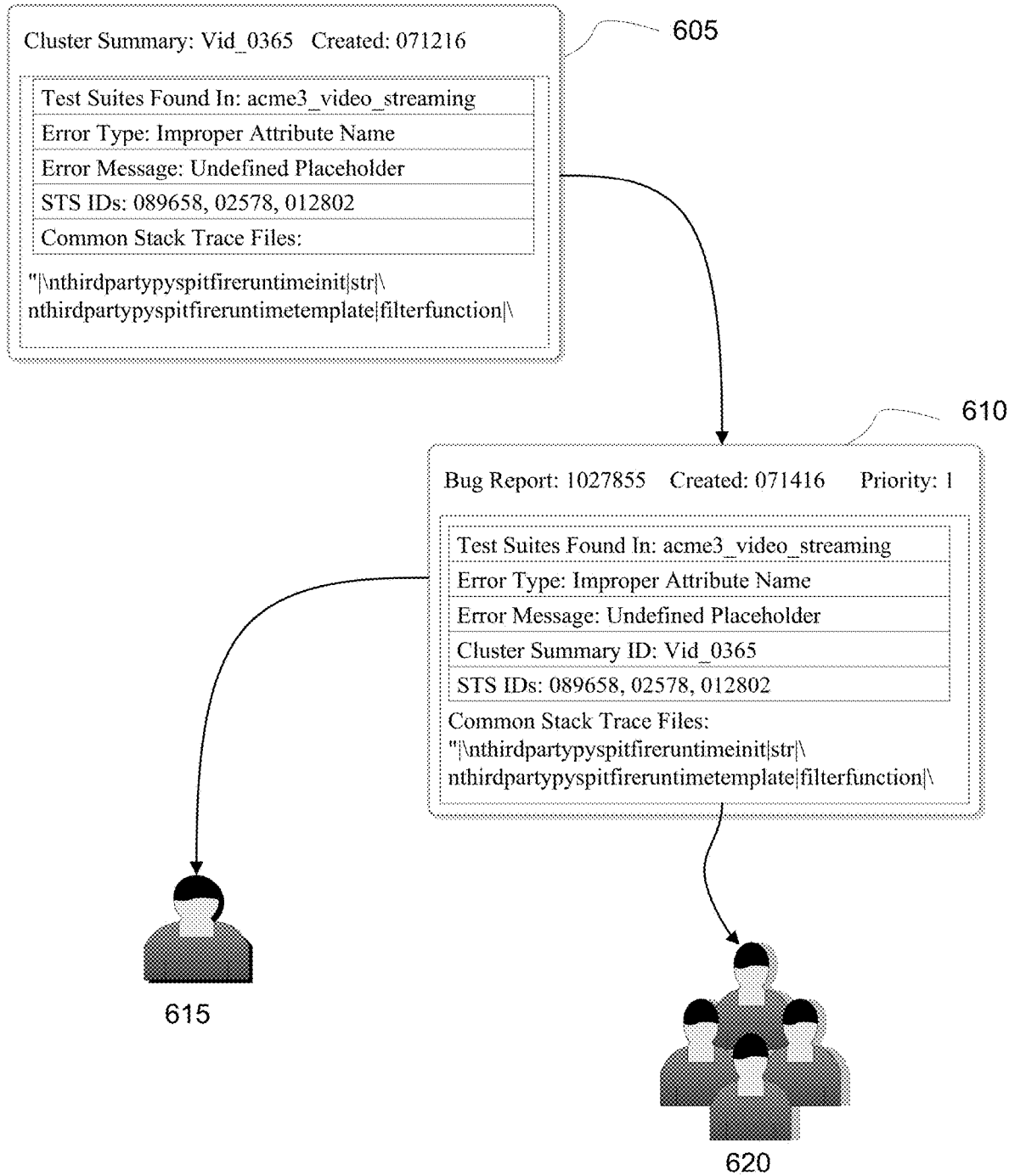
FIG. 6 illustrates an example of associating a cluster of language-independent stack trace summaries with a unique software test failure and assigning the software test failure to an individual and/or team according to some implementations.

FIG. 6 illustrates an example of associating a cluster of language-independent stack trace summaries with a unique software test failure and assigning the software test failure to an individual and/or team according to some implementations. As shown in FIG. 6, a cluster of language-independent stack trace summaries 605 has been created based on determining similarities among the language-independent stack trace summaries 505, 510, and 515 described in FIG. 5. The cluster of language-independent stack trace summaries 605 may be associated with a unique software test failure record, such as software test failure record 610. The clusterizer 235 associates the cluster of language-independent stack trace summaries 605 with a unique software test failure record based on comparing a value in the language-independent stack trace summaries included in the cluster to values stored one or more lookup tables identifying records of previously determined unique software test failures. For example, the clusterizer 235 may associated cluster 605 with software test failure record 610 based on comparing the file names identified as similar in the cluster 605 with the file names that were previously found to be associated with software test failure record 610. In some implementations, the clusterizer 235 may compare values corresponding to other metadata included in the cluster 605 to values in a lookup table of test failure records identifying previously determined software test failures. If no previously determined software test failure records are identified based on comparing the value in the cluster 605 to the values in the lookup tables, the clusterizer 235 may perform operations to create a new, canonical software test failure record and add the record to the lookup tables. If a previously identified software test failure record is identified based on the comparing, the clusterizer 235 may perform operations to mark the cluster as a duplicate of a previously determined software test failure record.

As shown in FIG. 6, the unique software test failure record 610 may be assigned to an owner-like individual 615. The assignment module 245 may assign the unique software test failure record 610 to individual 615 based on determining the change histories associated with the file names identified in the frames included in the generated language independent stack trace summary (from which the cluster 605 and unique software test failure record 610 were created and may also include). By ascertaining the change histories of the file names associated with the test failure, an individual who most recently changed the code included in the named files may be assigned to fix the code. Often the best resource to address a test failure may be the individual who has most recently introduced changes to the code for which the test failure corresponds. The clusterizer 235 may utilize revision or version control data, such as data included in the source code control system 240 shown in FIG. 2, to determine the file change histories in order to identify the individual who has most recently changed the files in order to assign the unique software test failure record 610 to that individual. In some implementations, the assignment module 245 may utilize code path or file ownership data, such as data included in the assignment module 245 itself or data received from the source code control system 240 shown in FIG. 2, in order to determine the individuals who are owners of the code paths or files that were associated with the test failure so that the unique software test failure record 610 may be assigned to the owner-like individual.

As further shown in FIG. 6, the unique software test failure 610 may be assigned to a team of individuals 620. The assignment module 245 may assign the unique software test failure 610 to team of individuals 620 based on determining the ownership of code paths that are associated with one or more files names identified in the frames included in the generated language independent stack trace summary (from which the cluster 605 and unique software test failure 610 were created and may also include). By determining the code path ownership corresponding to the file names associated with the test failure, a team of individuals who are responsible for developing and maintaining the code included in the files may be assigned to fix the code which produced the test failure. The assignment module 245 may utilize code path ownership data for files or code modules, such as data included in the source code control system 240 or data within the assignment module 245 itself, shown in FIG. 2, to determine the ownership of the code paths for the related files so that the unique software test failure 610 may be assigned to that team of individuals. In some implementations, the assignment module 245 may utilize file revision data or version control data, such as data included in the source code control system 240 shown in FIG. 2, to determine the file change histories in order to identify the team of individuals who are associated with the most recently changed files so that the unique software test failure record 610 may be assigned to that team of individuals.

Figure 7:
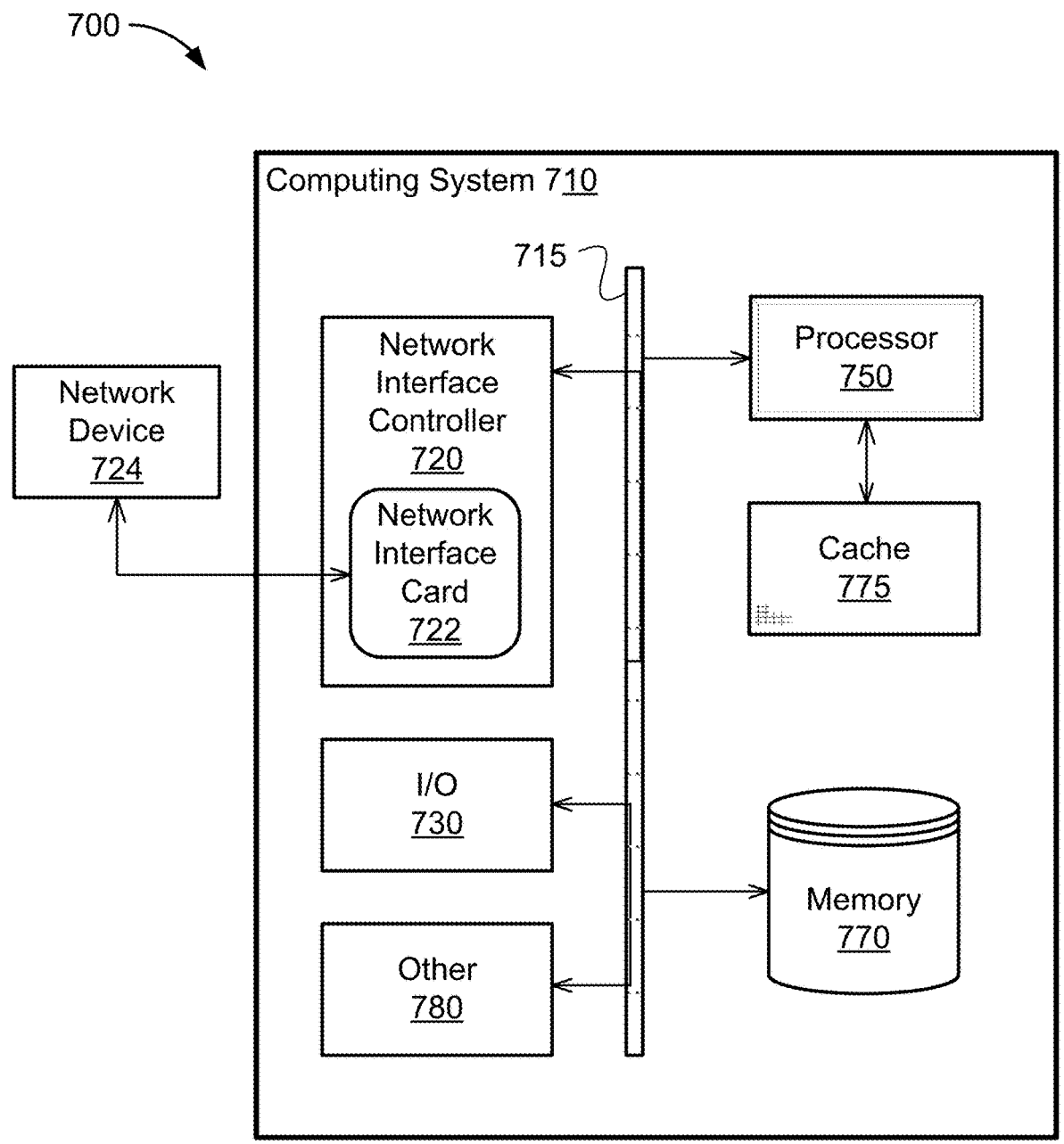
FIG. 7 is a block diagram of an example computing system.

FIG. 7 is a block diagram 700 illustrating an example computer system 710 with which the computing device 105, the test environment 110, and the stack trace processing server 120 of FIG. 1 can be implemented. In certain aspects, the computer system 710 may be implemented using hardware or a combination of software and hardware, either in a dedicated server, or integrated into another entity, or distributed across multiple entities.

In broad overview, the computing system 710 includes at least one processor 750 for performing actions in accordance with instructions and one or more memory devices 770 or 775 for storing instructions and data. The illustrated example computing system 710 includes one or more processors 750 in communication, via a bus 715, with at least one network interface driver controller 720 with one or more network interface cards 722 connecting to one or more network devices 724, memory 770, and any other devices 780, e.g., an I/O interface. The network interface card 722 may have one or more network interface driver ports to communicate with the connected devices or components. Generally, a processor 750 executes instructions received from memory. The processor 750 illustrated incorporates, or is directly connected to, cache memory 775.

In more detail, the processor 750 may be any logic circuitry that processes instructions, e.g., instructions fetched from the memory 770 or cache 775. In many embodiments, the processor 750 is a microprocessor unit or special purpose processor. The computing device 710 may be based on any processor, or set of processors, capable of operating as described herein. The processor 750 may be a single core or multi-core processor. The processor 750 may be multiple processors. In some implementations, the processor 750 can be configured to run multi-threaded operations. In some implementations, the processor 750 may host one or more virtual machines or containers, along with a hypervisor or container manager for managing the operation of the virtual machines or containers. In such implementations, the method shown in FIG. 3 can be implemented within the virtualized or containerized environments provided on the processor 750.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-ray® discs). A computing system 710 may have any number of memory devices 770. In some implementations, the memory 770 supports virtualized or containerized memory accessible by virtual machine or container execution environments provided by the computing system 710.

The cache memory 775 is generally a form of computer memory placed in close proximity to the processor 750 for fast read times. In some implementations, the cache memory 775 is part of, or on the same chip as, the processor 750. In some implementations, there are multiple levels of cache 775, e.g., L2 and L3 cache layers.

The network interface driver controller 720 manages data exchanges via the network interface driver 722 (also referred to as network interface driver ports). The network interface driver controller 720 handles the physical and data link layers of the OSI model for network communication. In some implementations, some of the network interface driver controller's tasks are handled by the processor 750. In some implementations, the network interface driver controller 720 is part of the processor 750. In some implementations, a computing system 710 has multiple network interface driver controllers 720. The network interface driver ports configured in the network interface card 722 are connection points for physical network links. In some implementations, the network interface controller 720 supports wireless network connections and an interface port associated with the network interface card 722 is a wireless receiver/transmitter. Generally, a computing device 710 exchanges data with other network devices 724 via physical or wireless links that interface with network interface driver ports configured in the network interface card 722. In some implementations, the network interface controller 720 implements a network protocol such as Ethernet.

The other network devices 724 are connected to the computing device 710 via a network interface driver port included in the network interface card 722. The other network devices 724 may be peer computing devices, network devices, or any other computing device with network functionality. For example, a first network device 724 may be a network device such as a hub, a bridge, a switch, or a router, connecting the computing device 710 to a data network such as the Internet.

The other devices 780 may include an I/O interface, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 700 includes an additional device 780 such as a coprocessor, e.g., a math co-processor can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources. The operations may be executed within the native environment of the data processing apparatus or within one or more virtual machines or containers hosted by the data processing apparatus.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers or one or more virtual machines or containers that are located at one site or distributed across multiple sites and interconnected by a communication network. Examples of communication networks include a local area network ("LAN") and a wide area network ("WAN"), an internetwork (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A computer-implemented method for generating a human-readable, language-independent stack trace summary, the method comprising:
    receiving a plurality of error reports, each error report including a language-dependent stack trace generated in response to a software test failure and a plurality of metadata, wherein the generated language-dependent stack trace includes one or more frames;
    generating a language-independent stack trace summary by processing each frame of the language-dependent stack trace, wherein the processing includes at least two of:
        removing line number values from each of the one or more frames,
        removing column number values from each of the one or more frames,
        collapsing one or more file names identified in each of the one or more frames,
        removing spaces from each of the one or more frames, and
        removing special characters from each of the one or more frames, and;
    outputting the generated language-independent stack trace summary;
    generating a cluster of language-independent stack trace summaries, wherein the cluster of stack trace summaries includes similar language-independent stack trace summaries; and
    determining the language-independent stack trace summaries are similar by comparing error types, error messages, and file names identified in each of one or more frames included in each of the language-independent stack trace summaries to one another.

2. The method of claim 1, wherein processing each frame of the language-dependent stack trace comprises at least three of:
    removing line number values from each of the one or more frames,
    removing column number values from each of the one or more frames,
    collapsing one or more file names identified in each of the one or more frames,
    removing spaces from each of the one or more frames, and
    removing special characters from each of the one or more frames.

3. The method of claim 1, wherein processing each frame of the language-dependent stack trace comprises:
    removing line number values from each of the one or more frames,
    removing column number values from each of the one or more frames,
    collapsing one or more file names identified in each of the one or more frames,
    removing spaces from each of the one or more frames, and
    removing special characters from each of the one or more frames.

4. The method of claim 1, further comprising applying a hash function to the generated language-independent stack trace summary and outputting the hashed language-independent stack trace summary.

5. The method of claim 1, wherein the plurality of metadata included in the error report identifies one or more of: a unique identifier, a build version, a client name, an HTTP referrer, an error type, or a test configuration description.

6. The method of claim 1, wherein the cluster is associated with a unique software test failure.

7. The method of claim 6, wherein associating the cluster with a unique software test failure is based on comparing a value in the language-independent stack trace summary to values stored in one or more lookup tables, wherein the one or more lookup tables include lists of previously determined unique software test failures.

8. The method of claim 6, wherein the unique software test failure is assigned to an owner-like individual based on determining change histories associated with one or more file names identified in one or more frames included in the language-independent stack trace summary.

9. The method of claim 6, wherein the unique software test failure is assigned to a team of individuals based on determining the ownership of code paths associated with one or more file names identified in one or more frames included in the language-independent stack trace summary and assigning the unique software test failure based on the determined code path ownership.

10. A system for generating a human-readable, language-independent stack trace summary, the system comprising:
    a memory storing computer-readable instructions and one or more lookup tables; and a processor, the processor configured to execute the computer-readable instructions, which when executed carry out the method comprising:

receiving a plurality of error reports, each error report including a language-dependent stack trace generated in response to a software test failure and a plurality of metadata, wherein the generated language-dependent stack trace includes one or more frames;

generating a language-independent stack trace summary by processing each frame of the language-dependent stack trace, wherein the processing includes at least two of:

removing line number values from each of the one or more frames, removing column number values from each of the one or more frames, collapsing one or more file names identified in each of the one or more frames, removing spaces from each of the one or more frames, and removing special characters from each of the one or more frames;

outputting the generated language-independent stack trace summary;

generating a cluster of language-independent stack trace summaries, wherein the cluster of stack trace summaries includes similar language-independent stack trace summaries; and determining the language-independent stack trace summaries are similar by comparing error types, error messages, and file names identified in each of one or more frames included in each of the language-independent stack trace summaries to one another.

11. The system of claim 10, wherein processing each frame of the language-dependent stack trace comprises at least three of:

removing line number values from each of the one or more frames, removing column number values from each of the one or more frames, collapsing one or more file names identified in each of the one or more frames, removing spaces from each of the one or more frames, and removing special characters from each of the one or more frames.

12. The system of claim 10, wherein processing each frame of the language-dependent stack trace comprises:

removing line number values from each of the one or more frames, removing column number values from each of the one or more frames, collapsing one or more file names identified in each of the one or more frames, removing spaces from each of the one or more frames, and removing special characters from each of the one or more frames.

13. The system of claim 10, wherein the memory further stores computer-readable instructions, which when executed cause the processor to apply a hash function to the generated language-independent stack trace summary and output the hashed language-independent stack trace summary.

14. The system of claim 10, wherein the plurality of metadata included in the error report identifies one or more of: a unique identifier, a build version, a client name, an HTTP referrer, an error type, or a test configuration description.

15. The system of claim 10, wherein the cluster is associated with a unique software test failure.

16. The system of claim 15, wherein associating the cluster with a unique software test failure is based on comparing a value in the language-independent stack trace summary to values stored in one or more lookup tables, wherein the one or more lookup tables include lists of previously determined unique software test failures.

17. The system of claim 15, wherein the unique software test failure is assigned to an owner-like individual based on determining change histories associated with one or more file names identified in each of one or more frames included in the language-independent stack trace summary.

18. The system of claim 15, wherein the unique software test failure is assigned to a team of individuals based on determining the ownership of code paths associated with one or more file names identified in each of one or more frames included in the language-independent stack trace summary and assigning the unique software test failure based on the determined code path ownership.

19. A computer-implemented method for generating a human-readable, language-independent stack trace summary, the method comprising:

receiving a plurality of error reports, each error report including a language-dependent stack trace generated in response to a software test failure and a plurality of metadata, wherein the generated language-dependent stack trace includes one or more frames;

generating a language-independent stack trace summary by processing each frame of the language-dependent stack trace, wherein the processing includes at least two of:

removing line number values from each of the one or more frames, removing column number values from each of the one or more frames collapsing one or more file names identified in each of the one or more frames, removing spaces from each of the one or more frames, and removing special characters from each of the one or more frames;

outputting the generated language-independent stack trace summary; and generating a cluster of language-independent stack trace summaries, wherein:

the cluster is associated with a unique software test failure, the cluster of stack trace summaries includes similar language-independent stack trace summaries, and (1) the unique software test failure is assigned to an owner-like individual based on determining change histories associated with one or more file names identified in one or more frames included in the language-independent stack trace summary, or (2) the unique software test failure is assigned to a team of individuals based on determining the ownership of code paths associated with one or more file names identified in one or more frames included in the language-independent stack trace summary and assigning the unique software test failure based on the determined code path ownership.

20. A system for generating a human-readable, language-independent stack trace summary, the system comprising:

a memory storing computer-readable instructions and one or more lookup tables; and a processor, the processor configured to execute the computer-readable instructions, which when executed carry out the method comprising:

receiving a plurality of error reports, each error report including a language-dependent stack trace generated in response to a software test failure and a plurality of metadata, wherein the generated language-dependent stack trace includes one or more frames;

generating a language-independent stack trace summary by processing each frame of the language-dependent stack trace, wherein the processing includes at least two of:

removing line number values from each of the one or more frames, removing column number values from each of the one or more frames, collapsing one or more file names identified in each of the one or more frames, removing spaces from each of the one or more frames, and removing special characters from each of the one or more frames;

outputting the generated language-independent stack trace summary; and generating a cluster of language-independent stack trace summaries, wherein:

the cluster is associated with a unique software test failure, the cluster of stack trace summaries includes similar language-independent stack trace summaries, and (1) the unique software test failure is assigned to an owner-like individual based on determining change histories associated with one or more file names identified in one or more frames included in the language-independent stack trace summary, or (2) the unique software test failure is assigned to a team of individuals based on determining the ownership of code paths associated with one or more file names identified in one or more frames included in the language-independent stack trace summary and assigning the unique software test failure based on the determined code path ownership.

* * * * *